2,966,418

RED INKS FOR BALL POINT FOUNTAIN PENS AND NOVEL COLORANTS THEREFOR

Norman L. Anderson, Hamburg, N.Y., assignor to Allied Chemical Corporation, a corporation of New York No Drawing. Filed Jan. 10, 1958, Ser. No. 708,063

8 Claims. (Cl. 106—22)

This invention relates to inks for ball point fountain pens and to novel colorants for preparing them. The inks are characterized by high color strength and brilliance.

The inks of the present invention contain high concentrations (preferably 40% to 50% by weight) of dissolved color. Their color strength exceeds that of conventional fountain pen inks by a factor of 20 fold or more. For example one cubic centimeter of an ink of the present invention will provide a written line of 10,000 to 15,000 feet equivalent to about 50,000 to 70,000 words, whereas an equal volume of conventional ink will provide a line of only 500 to 750 feet, equivalent to about 2,500 to 4,000 words. Ball point pens supplied with the inks of the present invention may be used, at average rates, for long periods before purchase of a refill cartridge containing a new ink supply is required. This advantage is important in enabling ball point fountain pens to compete successfully with conventional fountain pens.

Inks for ball point fountain pens must meet many exacting specifications if satisfactory trouble-free service is to be obtained because of certain mechanical strucutral features of the pen. The pen comprises a hollow tube open at the upper end and tapered at the lower end to a socket in which a hard (stainless steel, tungsten carbide or sapphire) ball, having a diameter of about 1 millimeter, rotates. Clearance between the ball and socket varies from 1 to 5 microns depending on the style of pen and viscosity of ink used. The hollow tube serves as the ink reservoir which feeds the ink by gravity into the socket and against the upper surface of the ball. When the pen is used, the ball rotates and transfers ink onto the receiving surface.

Although it is highly desirable that ball point fountain pen inks shall have a high concentration of color value, it is likewise important that the color should not crystallize out; this is particularly likely to happen if solvent evaporates from ink at the open tip of the ball point, which results in a "freezing" of the ball to the socket. Accordingly the solvent used in the ink should have a low vapor pressure to avoid this evaporation. Likewise the solvent should not be so hygroscopic that sufficient water will be absorbed from the atmosphere into ink exposed at the ball point to cause precipitation of color. For similar reasons the ink must be free of dust, grit, and insoluble matter and must be non-corrosive to the ball, socket or channel parts of the pen.

A ball point pen ink should be sufficiently viscous so that the ink will neither seep past the ball nor leak from the open upper end of the reservoir tube when the pen is inverted. Yet it must also be sufficiently fluid so that a film of ink is drawn between the ball and socket and onto the writing surface without producing an excessive drag on the ball as it rotates. Such drag causes the ink line to be thin with a resultant loss of color intensity, definition and legibility. The viscosity should also change very little within the range of temperatures at which use of the pen may be required, i.e. circa 0° to 100° F.

It has heretofore been known that diaryl guanidine salts of acid forms of sulfonic acid dyes are, as a rule, soluble in ethanol and the like and hence useful for dyeing proxylin lacquers, spirit varnishes and the like. However, tests of hundreds of such colorants have shown that less than 0.5% of those tested had the color strength, light-fastness, water-fastness and especially, the solubility in the ink solvents of the present invention required to make a ball point fountain pen ink of acceptable quality. No relationship is known which would enable one to predict whether or not a colorant is suitable for the inks of the present invention, particularly as to solubility characteristics, upon the basis of the molecular structure of the colorant.

The novel colorants of the present invention have the following formula

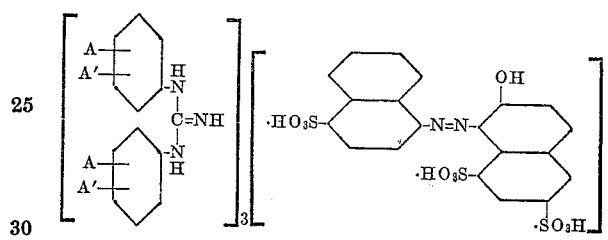

wherein the rings are benzene rings, A and A' represent members of the group consisting of H, $CH_3$, $C_2H_5$, $C_3H_7$ and i-$C_3H_7$, located in any of positions 2 to 6 in the rings. The colorants defined by this structure may be considered as salts containing three mols of a basic component and one mol of acidic component containing, per molecule, three groups which are capable of reacting as sulfonic acid groups. The basic groups are diphenyl guanidines of the structure.

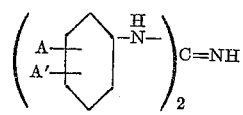

where A and A' are defined as above. The acid component is the acid form of New Colour Index Acid Red 18.

The colorants of the present invention are brilliant scarlet. They possess extreme solubility in the solvent media, hereinafter defined, which characterize the inks of the present invention. They may be used as sole colorant in non-permanent inks such as copying inks and as shading components in permanent inks.

The colorants are ordinarily prepared by heating a mixture of an aqueous solution of the diaryl guanidine component and an aqueous solution of the dye component. The resulting diaryl guanidine salt of the acid form of the dye (which salt must be insoluble in water if the color is to be water-fast) precipitates out and is then isolated, dried, and ground.

The solvent characterizing the inks of the present invention consists—to the extent of at least 90% by weight—of a compound or a mixture of such compounds having the general formula:

wherein: R' is selected from the group consisting of H and $C_1$-$C_8$ alkyl groups, R is an alkylene group containing from 2 to 10 carbon atoms, inclusive, n is an integer from 1 to 5, inclusive, and the total number of carbon atoms is from 2 to 10, inclusive.

Preferred solvents of this class are diols, i.e. compounds of the above general formula wherein R' is hydrogen.

Representative solvents of this class include ethylene glycol, propylene glycol, 1,3-butanediol, hexylene glycol, octylene glycol, monomethylether of ethylene glycol, ("Methyl Cellosolve"), diethylene glycol, triethylene glycol, dipropylene glycol, and monoethyl ether of diethylene glycol ("Carbitol").

The inks of this invention should contain at least 25% of dissolved color to assure adequate color strength; (this dissolved color may include, however, colorants other than those characterizing the present invention). Preferably the color concentration should be from 40% to 50%. Color concentrations as high as 55% to 60% are obtainable with some formulations. The ink viscosity may vary according to the style of the pen, particularly with reference to the clearance between the ball and socket at the ball point. In general, the desired viscosity will range between 8,000 and 15,000 cps. at 25° C. Usually the desired viscosity is obtained simply by adjusting the color content of the formulation because, at the high color concentrations involved, small changes in color concentration produce relatively large changes in viscosity. Viscosity may also be adjusted by incorporating a suitable resin into the ink although usually this is neither necessary nor desirable.

If it is desired to modify the color of the ink, a shading component may be included. The following colors (in proportions limited by their low solubilities) have been found to be suitable as shading components: Auramine O (New Colour Index Basic Yellow 2); Victoria Green WB (New Colour Index Basic Green 4); Eosine OJ (New Colour Index Acid Red 87); Ethyl Eosine (Old Colour Index No. 770); Iosol Red (New Colour Index Solvent Red 68); Rhodamine B Base (Old Colour Index No. 749); and Methyl Violet 2B Base (New Colour Index Solvent Violet 8).

Other colorants may be present in larger proportions. For example, the colorants of the present invention may be used in inks of my copending applications filed November 25, 1957, Serial Numbers 698,332 and 698,380, in either small proportions as shading components or in large proportions where its unusual properties are desirable. Especially satisfactory combinations of the colorants of the present invention are described and claimed in my application Serial Number 706,911, filed January 3, 1958, entitled "Red Ball Point Fountain Pen Inks and Colorants Therefor."

It is often desirable to incorporate about 1% to 5% by weight of oleic acid or the like into the ink to lubricate the ball and socket.

Despite the fact that the solvent medium has a very low vapor pressure, the "drying" time of the inks of the invention is satisfactory because the solvent is usually absorbed by the paper and because the ink film laid down by the pen is very thin and contains a relatively low solvent/color ratio when compared to other inks.

The inks are made by dissolving the color in the solvent, suitably by use of a high speed agitator, and then centrifuging the resulting solution to remove the last traces of the insoluble matter.

The following representative examples describe colorants and inks within the scope of the present invention.

EXAMPLE 1

(A) Preparation of colorant

The colorant used in this example was a salt in which the basic component was di(mixed xylyl) guanidine and the acid component was the acid form of the dyestuff New Colour Index Acid Red 18, which dyestuff was prepared, in a manner well known to the prior art, by diazotizing naphthionic acid and coupling the diazo compound into 2-hydroxynaphthalene-6,8-disulfonic acid. The resulting azo compound contained three free sulfonic acid groups and hence three mol equivalents of di(mixed xylyl) guanidine were needed to neutralize it.

One mol equivalent (604 parts) of said dyestuff (in the form of the trisodium salt) was dissolved in 600 parts of water at 60° C. The solution was charged with a solution of three mol equivalents (781 parts) of di(mixed xylyl)guanidine in 500 parts of water. 34.8 parts of 20° Bé. aqueous hydrochloric acid solution was added in small increments during one hour. When the addition of acid was complete the product precipitated out and was isolated by filtration. The filter cake was washed with 2000 parts of cold water, dried at 70–80° C., and ground to a fine powder. A yield of 880 parts of Colorant A was obtained.

The di(mixed xylyl)guanidine was prepared by nitrating a commercial coal tar xylene containing about 62% m-xylene, 27% p-xylene, 18% o-xylene and 3% ethyl benzene, reducing the resulting mixture of nitroxylenes to obtain a mixture of xylidines, condensing this mixture with carbon disulfide, and treating the reaction product with ammonia and litharge.

(B) Solubility of colorant in solvents suitable for ink formulation

Colorant A was found to dissolve readily at room temperature in the following solvents to give solutions containing at least 35% by weight of color: diethylene glycol, triethylene glycol, propylene glycol; 1,3-butanediol; hexylene glycol; octylene glycol; monoethylether of diethylene glycol ("Carbitol").

(C) Preparation of ink

An ink was prepared by agitating the following mixture at room temperature in a high speed agitator until the color was completely dissolved:

| Components: | Parts by weight |
|---|---|
| Colorant A | 50 |
| Oleic acid | 2 |
| Propylene glycol | 48 |

The resulting solution was centrifuged to remove traces of insoluble matter. The resulting ink had a viscosity of about 8500 centipoises at 25° C. and wrote freely and evenly in ball point fountain pens, giving a scarlet line of excellent brilliance and tinctorial strength, which "dried" quickly and showed good resistance to smearing, feathering, offset and bleeding.

The color concentration of the ink was tested in a "mechanical scriber" which maintained a pen point and paper roll in relative motion so that a compressed zigzag line was continuously formed on the paper. The color concentration was found to be equivalent to a line of over 15,000 feet in length per cubic centimeter of ink consumed.

The light fastness of a sample of writing made with the ink was tested by exposure to intense ultraviolet irradiation in the "Fade-O-Meter." The writing remained legible after 16 hours exposure.

EXAMPLE 2

An ink was prepared by agitating the following mixture at room temperature in a high speed agitator until a complete solution was obtained.

| Component: | Parts by weight |
|---|---|
| Octylene glycol | 25 |
| 1,3-butanediol | 25 |
| Oleic acid | 5 |
| Rhodamine B base | 10 |
| Colorant A | 35 |

The resulting ink has a viscosity between 10,200 and 10,800 at 25° C. It possesses substantially the same properties as the ink of Example 1, except that it is somewhat bluer in shade and possesses better fastness to water and light.

I claim:
1. An ink suitable for ball point pens comprising essentially a solution of at least one compound of the formula

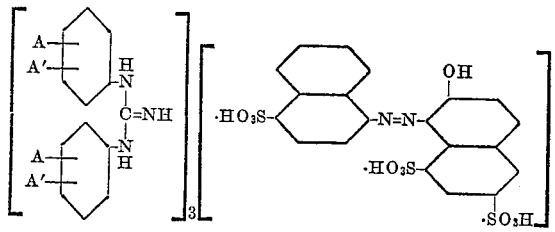

wherein A and A' each represents a member of the group consisting of H and $C_1$–$C_3$ alkyl, in a solvent comprising a $C_2$–$C_{10}$ compound of the formula $$R'O(RO)_nH$$

wherein R' represents a member of the group consisting of H and $C_1$–$C_8$ alkyl, R represents $C_2$–$C_{10}$ alkylene, and $n$ represents an integer from 1 to 5, inclusive.

2. An ink suitable for ball point pens comprising essentially a solution of at least one dixylyl guanidine salt of the acid form of Colour Index Acid Red 18 in a solvent comprising a $C_2$–$C_{10}$ compound of the formula $$R'O(RO)_nH$$

wherein: R' represents a member of the group consisting of H and $C_1$–$C_8$ alkyl, R represents $C_2$–$C_{10}$ alkylene, and $n$ represents an integer from 1 to 5, inclusive.

3. An ink suitable for ball point pens consisting essentially of a solution of at least one compound of the formula set out in claim 1 in a solvent which is at least 90% of a $C_2$–$C_{10}$ diol of the formula $$HO(RO)_nH$$

wherein R represents $C_2$–$C_{10}$ alkylene, and $n$ equals 1 to 5, inclusive.

4. An ink suitable for ball point pens, consisting essentially of a solution of at least one dixylyl guanidine salt of the acid form of Colour Index Acid Red 18 in a solvent which is at least 90% $C_2$–$C_{10}$ diol of the formula $$HO(RO)_nH$$

wherein R represents $C_2$–$C_{10}$ alkylene, and $n$ equals 1 to 5, inclusive.

5. An ink as defined in claim 3 wherein at least one compound of the formula set out in claim 1 constitutes at least 25% of total colorant in the ink.

6. An ink as defined in claim 3 wherein at least one compound of the formula set out in claim 1 constitutes at least 25% of said ink.

7. An ink as defined in claim 4 wherein said dixylyl guanidine salt of the acid form of Colour Index Acid Red 18 constitutes at least 25% of said ink.

8. An ink as defined in claim 6 containing as a minor colorant, Rhodamine B base.

References Cited in the file of this patent
UNITED STATES PATENTS

| | | |
|---|---|---|
| 1,674,128 | Rose | June 19, 1928 |
| 2,165,034 | Daudt et al. | July 14, 1939 |
| 2,623,827 | Moos | Dec. 30, 1952 |

OTHER REFERENCES

Lubs: "The Chemistry of Synthetic Dyes and Pigments," pub. 1955 by Reinhold, N.Y.C. (pages 177–8).

Colour Index: 2nd ed. (1956), vol. 2 (pages 2840, 2853–4, 2882–3, 2896 and 2904).

Gould et al.: "Inks for Ball Point Pens," American Ink Maker, July 1951 (pages 36–40 and 67).